US008918007B2

(12) United States Patent
Tamaoki

(10) Patent No.: US 8,918,007 B2
(45) Date of Patent: Dec. 23, 2014

(54) VOLTAGE GENERATING DEVICE AND IMAGE FORMING APPARATUS INCLUDING THE SAME

(71) Applicant: Canon Kabushiki Kaisha, Tokyo (JP)

(72) Inventor: Tomohiro Tamaoki, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 13/856,245

(22) Filed: Apr. 3, 2013

(65) Prior Publication Data

US 2013/0287424 A1 Oct. 31, 2013

(30) Foreign Application Priority Data

Apr. 27, 2012 (JP) ................................ 2012-103835

(51) Int. Cl.

*G03G 15/00* (2006.01)
*G03G 15/08* (2006.01)
*H02M 3/335* (2006.01)
*G03G 15/06* (2006.01)

(52) U.S. Cl.

CPC .................................... *G03G 15/065* (2013.01)
USPC ................. 399/88; 399/55; 399/270; 363/17; 363/21.01; 363/132; 363/351

(58) Field of Classification Search

USPC .............. 399/55, 88, 270, 285; 323/223, 355; 363/17, 21.01, 132, 282, 351
See application file for complete search history.

(56) References Cited

U.S. PATENT DOCUMENTS

| | | | | |
|---|---|---|---|---|
| 6,445,141 | B1 * | 9/2002 | Kastner et al. | 315/307 |
| 8,036,557 | B2 * | 10/2011 | Kinouchi et al. | 399/69 |
| 2005/0281059 | A1 * | 12/2005 | Yasumura | 363/16 |
| 2009/0028593 | A1 * | 1/2009 | Okumura | 399/55 |
| 2010/0155395 | A1 * | 6/2010 | Suenaga et al. | 219/702 |
| 2011/0020028 | A1 | 1/2011 | Okumura | |
| 2011/0188878 | A1 * | 8/2011 | Watanabe et al. | 399/88 |
| 2011/0293314 | A1 * | 12/2011 | Saito et al. | 399/88 |

FOREIGN PATENT DOCUMENTS

JP 2011-27937 A 2/2011

* cited by examiner

*Primary Examiner* — Francis Gray

(74) *Attorney, Agent, or Firm* — Fitzpatrick, Cella, Harper & Scinto

(57) ABSTRACT

A power supply apparatus outputs a developing voltage in which a pulse wave shape at a time of positive amplitude is different from a pulse wave shape at a time of negative amplitude. Voltages are supplied from two switching regulators respectively to a bridge circuit for driving a transformer. Here, an absolute value of a difference between a drive frequency of a first switching regulator and a drive frequency of a second switching regulator is configured to be not less than an invisible frequency at which a banding cannot be recognized by humans.

12 Claims, 6 Drawing Sheets

VOLTAGE GENERATING DEVICE AND IMAGE FORMING APPARATUS INCLUDING THE SAME

BACKGROUND OF THE INVENTION

1. Field of the Invention

The present invention generally relates to voltage generating devices, and particularly relates to voltage generating devices that are used in image forming apparatuses.

2. Description of the Related Art

Development devices that develop electrostatic latent images using a two-component developer are present as development devices equipped in electrophotographic system and electrostatic recording system image forming apparatuses. The main components of two-component developer are a nonmagnetic toner and a magnetic carrier. A power supply apparatus enables the toner to more easily develop the latent image by applying a developing voltage, in which a direct current and an alternating current are superimposed, to a development sleeve. However, when a high voltage is applied to the gap (development gap) between the photosensitive member and the development sleeve, a ring shaped or spot shaped pattern (hereinafter referred to as a ring mark) is sometimes produced on the recording paper.

According to US Publication No. 2011/0020028, by configuring a positive amplitude absolute value |Vp+| relatively smaller than a negative amplitude absolute value |Vp−| of a positive amplitude Vp+ and a negative amplitude Vp−, which are the amplitude of the alternating current voltage contained in the developing voltage, ring marks produced in background areas are easily suppressed.

In this regard, the power supply apparatus that generates the developing voltage may be provided with two switching regulators for driving a transformer. The switching element provided in each of the switching regulators executes a switching operation at a predetermined drive frequency. Accordingly, sometimes a periodic ripple that is dependent on this drive frequency is contained in the voltage outputted by each of the switching regulators. By being supplied with voltages from the two switching regulators, the transformer generates the developing voltage. Accordingly, if a ripple is contained in the voltages outputted by the two switching regulators, an influence of the ripple will appear also in the developing voltage. Although the drive frequencies of the two switching regulators are designed to be the same frequency, in reality the two drive frequencies are not identical due to variation in circuit components. When the difference between these two drive frequencies becomes a beat component and appears in the developing voltage, so-called a banding is formed undesirably on the recording paper.

SUMMARY OF THE INVENTION

Accordingly, the present invention reduces the banding originating in the drive frequencies of switching regulators provided in power supply apparatuses.

An embodiment of the present invention provides an image forming apparatus comprising the following element. A developing unit is configured to carry out developing by causing a developer to adhere to an electrostatic latent image formed on an image carrier. A voltage generating circuit is configured to supply to the developing unit a development bias voltage in which a voltage of a positive pulse is different from a voltage of a negative pulse. The voltage generating circuit may comprise the following element. A voltage conversion unit is configured to convert a voltage inputted from a primary side to a voltage of a different magnitude and outputs to a secondary side. A bridge circuit is connected to the primary side. A first switching regulator is configured to generate a first voltage to be applied to the bridge circuit. A second switching regulator is configured to generate a second voltage to be applied to the bridge circuit. A drive frequency of the first switching regulator and a drive frequency of the second switching regulator are configured so that an absolute value of a difference between the drive frequency of the first switching regulator and the drive frequency of the second switching regulator is not less than a predetermined frequency.

Further features of the present invention will become apparent from the following description of exemplary embodiments with reference to the attached drawings.

DESCRIPTION OF THE EMBODIMENTS

Figure 1:
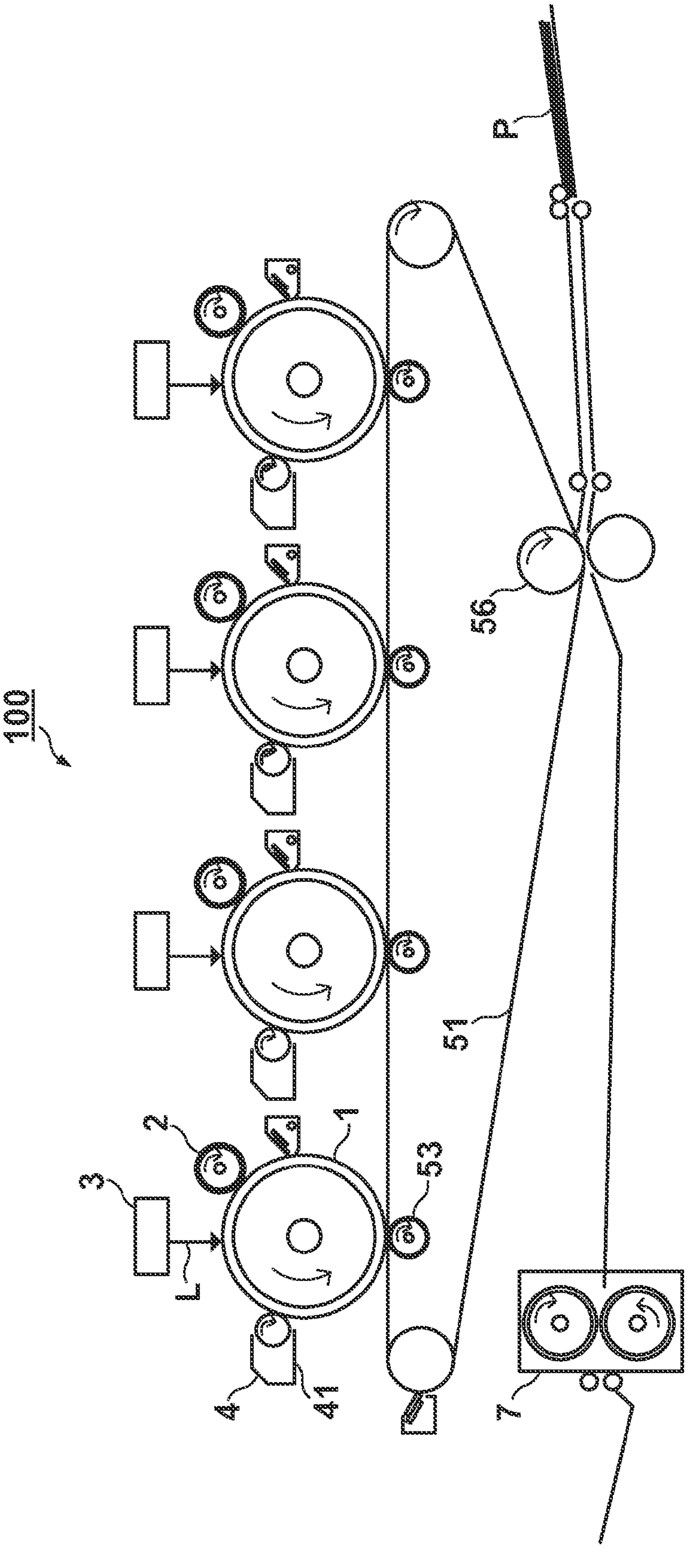
FIG. 1 is an outline cross-sectional view of an image forming apparatus.

Description is given using FIG. 1 regarding an electrophotographic processing method image forming apparatus in which a power supply apparatus according to the present invention can be applied. An image forming apparatus 100 has four image forming stations, these being for yellow, magenta, cyan, and black. A photosensitive member 1 is an image carrier that carries an electrostatic latent image and a toner image. A charging roller 2 is a charging unit that charges a surface of the photosensitive member 1 so that its electric potential becomes a uniform electric potential. An exposure device 3 is an exposure unit that forms an electrostatic latent image by irradiating a light L onto the surface of the uniformly charged photosensitive member 1. A developing device 4 is a developing unit that causes toner to adhere to the electrostatic latent image formed on the surface of the photosensitive member 1 to form a toner image. The developing device 4 is provided with a development sleeve 41 for causing the toner to adhere to the photosensitive member 1. A developing voltage is applied to between the development sleeve 41 and the photosensitive member 1. A primary transfer roller 53 is a unit that transfers the toner image formed on the photosensitive member 1 to an intermediate transfer belt 51. The toner transferred to the intermediate transfer belt 51 is transferred to a recording paper P by a secondary transfer roller pair 56.

Figure 2:
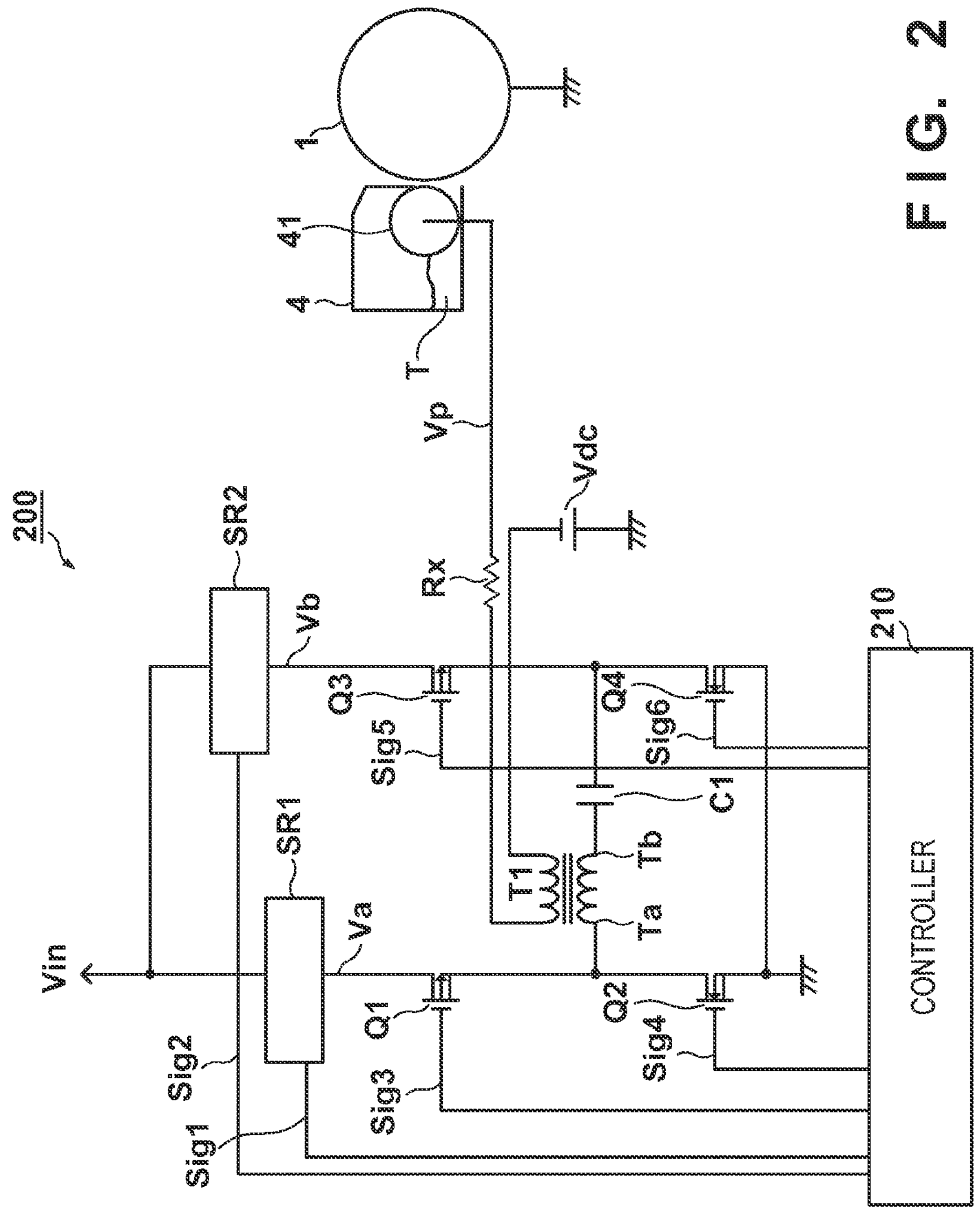
FIG. 2 is a circuit diagram of a power supply apparatus.

Description is given using FIG. 2 regarding a configuration of a power supply apparatus 200. The power supply apparatus 200 supplies to the development sleeve 41 a developing voltage in which the pulse wave shape at a time of positive amplitude is different from the pulse wave shape at a time of negative amplitude, and which has a rest period in which no pulse is outputted. The wave shape of this developing voltage is called a biasing duty blank pulse wave shape. The power supply apparatus 200 is provided with a transformer T1 that functions as a voltage conversion unit, which converts the voltage inputted from a primary side to a voltage of a different magnitude and outputs to a secondary side. A voltage conversion element such as a piezoelectric element or the like may be employed instead of the transformer T1. Further still, the power supply apparatus 200 is constituted by four FETs, and is provided with a bridge circuit, which connects to the primary side of the transformer T1, and two switching regulators SR1 and SR2. The switching regulators SR1 and SR2 are designed so that in principle they perform switching operations at identical drive frequencies. However, in fact, these drive frequencies are sometimes slightly different, thereby causing the banding in the image.

A power supply voltage Vin is inputted to the switching regulators SR1 and SR2. A controller 210 outputs a voltage configuring signal Sig1 to the switching regulator SR1 to configure the output voltage of the switching regulator SR1. Due to this, the switching regulator SR1 outputs a voltage Va (example: 9V) corresponding to the voltage configuring signal Sig1. In this way, the switching regulator SR1 functions as a first switching regulator that generates a first voltage Va to be applied to the bridge circuit. Similarly, the controller 210 outputs a voltage configuring signal Sig2 to the switching regulator SR2 to configure the output voltage of the switching regulator SR2. Due to this, the switching regulator SR2 outputs a voltage Vb (example: 21V) corresponding to the voltage configuring signal Sig2. In this way, the switching regulator SR2 functions as a second switching regulator that generates a second voltage Vb to be applied to the bridge circuit.

Symbols Q1 and Q3 indicate P channel MOSFETs. Symbols Q2 and Q4 indicate N channel MOSFETs. The controller 210 outputs drive signals Sig3 to Sig6. The drive signal Sig3 is a gate signal that drives the FET Q1. The drive signal Sig4 is a gate signal that drives the FET Q2. The drive signal Sig5 is a gate signal that drives the FET Q3. The drive signal Sig6 is a gate signal that drives the FET Q4.

The voltage Va outputted from the switching regulator SR1 is applied to a drain of the FET Q1. A source of the FET Q1 is connected to a drain of the FET Q2 and a Ta terminal of a primary winding of the transformer T1. The voltage Vb outputted from the switching regulator SR2 is applied to a drain of the FET Q3. A source of the FET Q3 is connected to a drain of the FET Q4 and one end of a capacitor C1. The other end of the capacitor C1 is connected to a Tb terminal of a primary winding of the transformer T1. One end of a secondary winding of the transformer T1 is connected to a direct current voltage Vdc and the other end is connected to the development sleeve 41 through a resistor Rx. It should be noted that developer T is stored inside the developing device 4.

Figure 3:
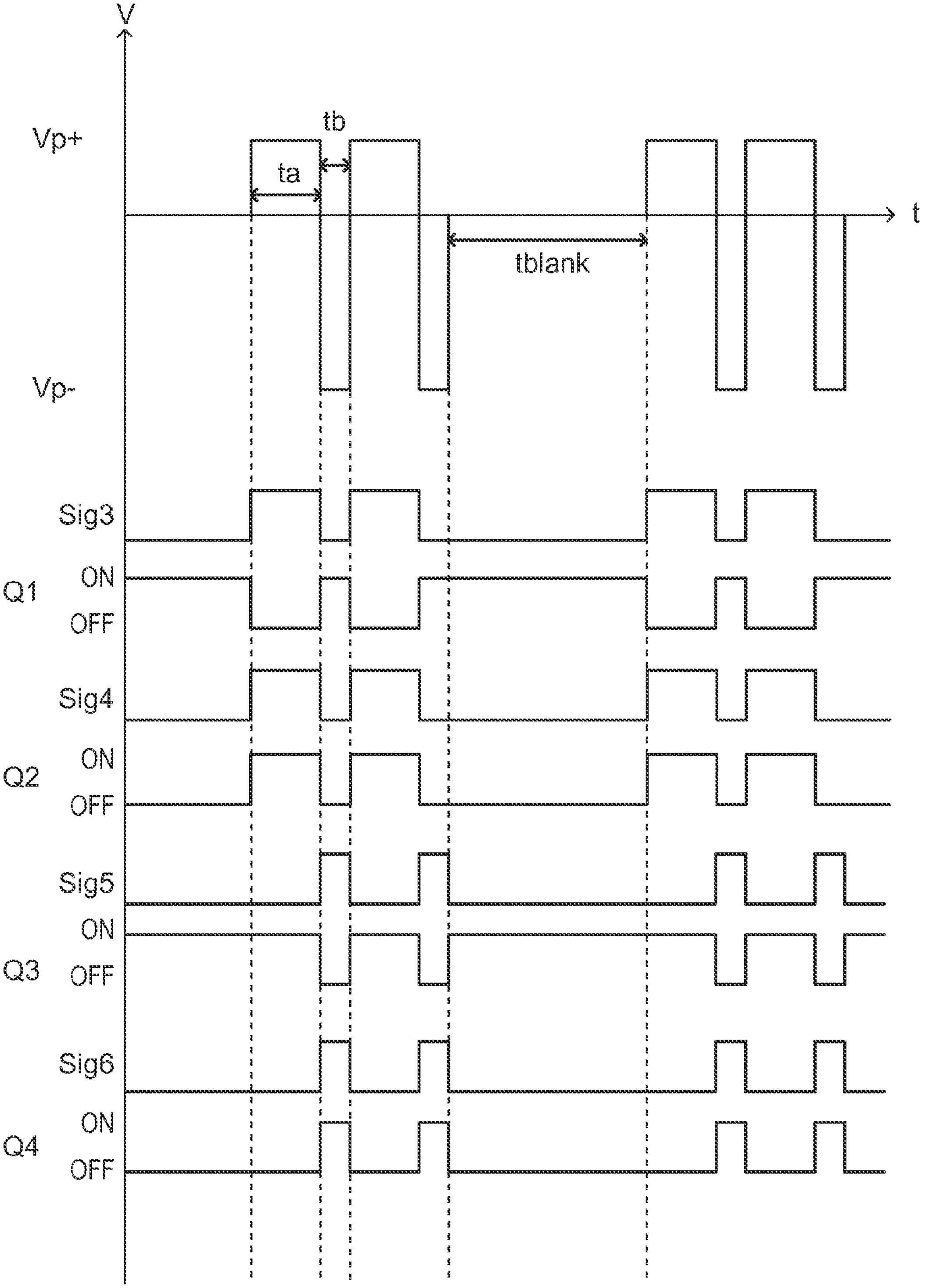
FIG. 3 is a diagram showing a relationship between a developing voltage and a drive signal that it generates.

Description is given using FIG. 3 regarding a developing voltage outputted by the transformer T1, the drive signals Sig3 to Sig6, and an on/off operation of the FETs Q1 to Q4. In FIG. 3 the vertical axis indicates voltage and the horizontal axis indicates time. As shown in FIG. 3, the wave shape of the developing voltage is a so-called biasing duty blank pulse wave shape. A biasing duty blank pulse wave shape is generally constituted by an oscillation portion (pulse portion) and a rest portion (blank portion). Further still, in the oscillation portion, the two pulse widths (duty) and the amplitudes are different. Furthermore, in order to suppress occurrences of ring marks, the absolute value |Vp+| of the positive amplitude is configured smaller than the absolute value |VP−| of the negative amplitude.

In order to form a blank portion, it is necessary that the FET Q1 and the FET Q3 are turned on and the FET Q2 and the FET Q4 are turned off. Accordingly, the controller 210 generates and outputs the drive signals Sig3 to Sig6 as shown in FIG. 3. In the blank portion, a 12V electric potential difference is produced from the left side terminal to the right side terminal of the capacitor C1 and the capacitor C1 is charged. On the other hand, in a period to of the oscillation portion, the controller 210 generates and outputs the drive signals Sig3 to Sig6 as shown in FIG. 3 so that the FET Q2 and the FET Q3 are turned on and the FET Q1 and the FET Q4 are turned off. The capacitor C1 is charged and the voltage at both of its ends becomes 12V. Accordingly, 9V is applied to the primary winding of the transformer T1 from the Ta terminal to the Tb terminal. In a period tb, the controller 210 generates and outputs the drive signals Sig3 to Sig6 as shown in FIG. 3 so that the FET Q1 and the FET Q4 are turned on and the FET Q2 and the FET Q3 are turned off. Since the voltage at both ends of the capacitor C1 is 12V, −21V is applied to the primary winding of the transformer T1 from the Ta terminal to the Tb terminal. The transformer T1 transforms these primary side voltages to generate the developing voltage, which is applied to the development sleeve 41. The amplitude of the developing voltage extends to 1500 Vpp for example.

The period to is 70 μsec for example, and the period tb is 30 μsec for example. Accordingly, the total length of the period in which the Vp+ amplitude pulse and the Vp− amplitude pulse of the wave shape of the developing voltage are outputted is 100 μsec. Therefore, the frequency of the oscillation portion of the developing voltage is 10 kHz. It should be noted that in FIG. 3 the period of the blank portion is denoted as tblank.

Figure 4:
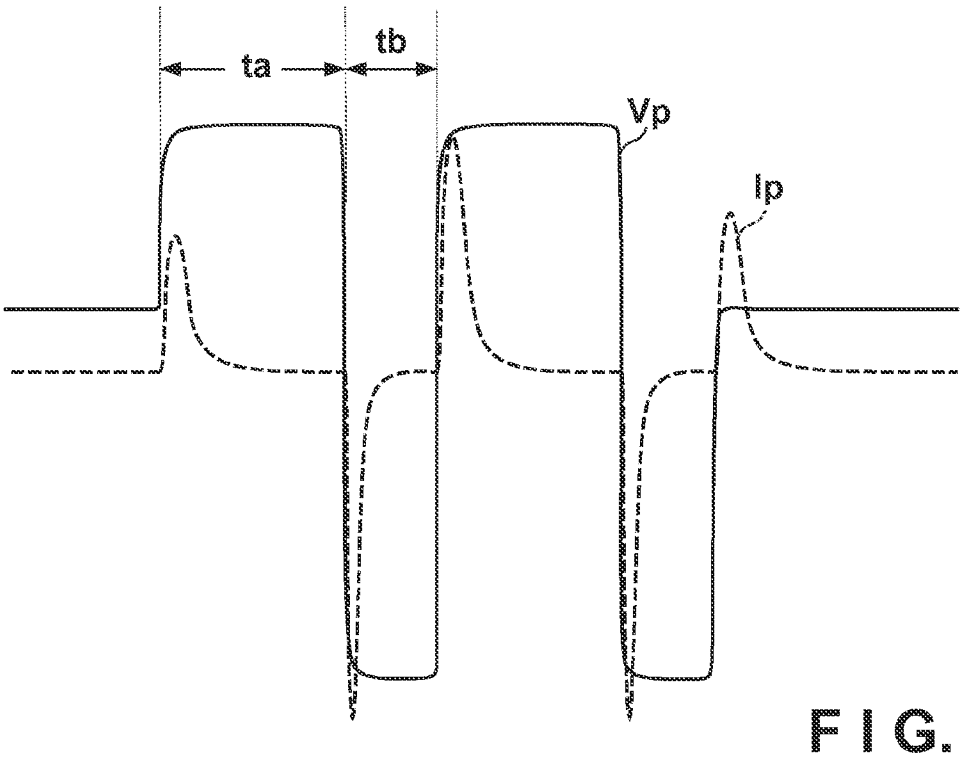
FIG. 4 is a diagram showing a relationship between a developing voltage and a primary side electric current of a transformer.

Description is given using FIG. 4 regarding a relationship between the developing voltage Vp outputted by the transformer T1 and an electric current Ip that flows to the primary winding of the transformer T1. The wave shape of the developing voltage Vp is a biasing duty blank pulse wave shape as described above. That is, a local peak occurs in the electric current Ip with the timing by which the blank portion transitions to the oscillation portion, the transition timing between the pulse of the period to and the pulse of the period tb, and the timing by which there is a transition from the pulse of the period tb to the blank portion. The electric current Ip becomes an electric current that charges a capacitance component existing between the development sleeve 41 and the photosensitive member 1 through the transformer T1.

Figure 5:
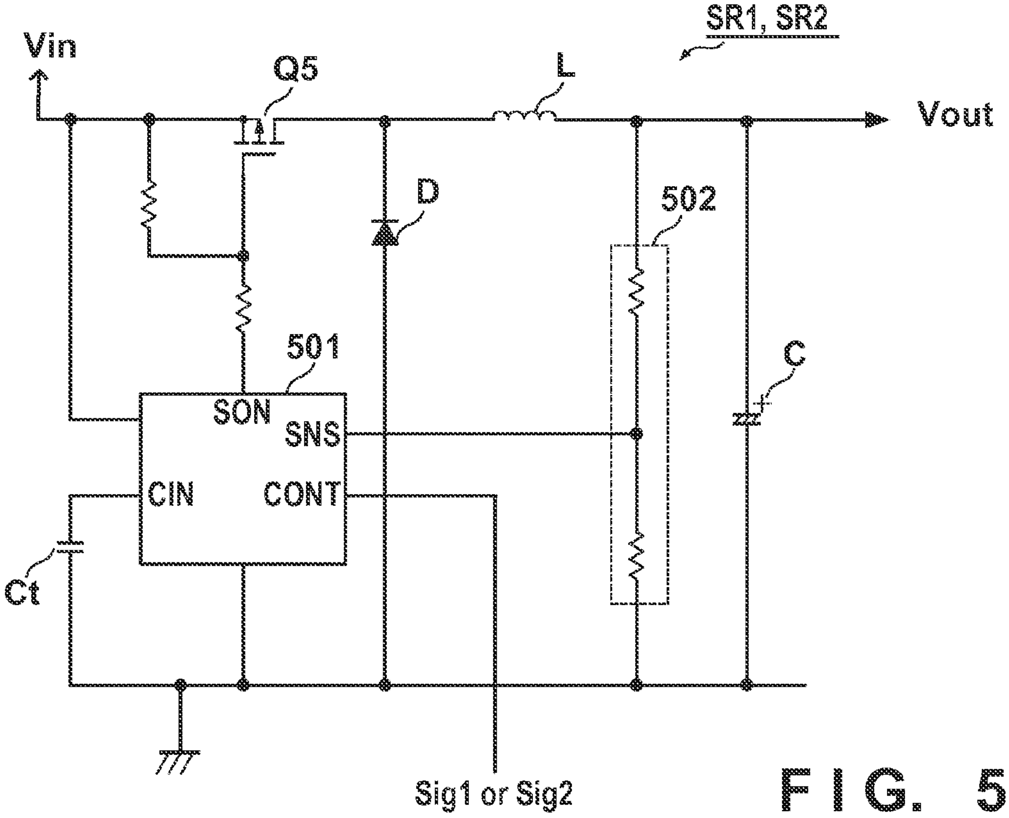
FIG. 5 is a circuit diagram of a switching regulator.

Description is given using FIG. 5 regarding an operation of the switching regulators SR1 and SR2. It should be noted that the internal configurations of the switching regulators SR1 and SR2 are identical. In FIG. 5, the power supply voltage Vin is applied through a FET Q5 and an inductor L to an output capacitor C, and outputted from an output terminal Vout. When the FET Q5 turns on in response to a gate signal (SON signal) outputted by a control IC 501, the power supply voltage Vin is supplied to the output capacitor C through the inductor L. The end voltages of the output capacitor C, that is, the voltages Va and Vb of the output terminal Vout, rise. In the period in which the FET Q5 is off, a flywheel electric current flows to a diode D and the inductor L.

The control IC 501 outputs a SON signal so that a detection voltage (SNS signal), which is obtained by performing voltage division on the voltages Va and Vb with a detection resistor 502, conforms to a control voltage (CONT signal). By turning on/off the FET Q5 in accordance with the SON signal, the detection voltage (SNS signal) conforms to the control voltage (CONT signal).

A timing capacitor Ct is a capacitor that determines an oscillation frequency of an oscillation circuit inside the control IC 501. One end of the timing capacitor Ct is connected to a CIN terminal of the control IC 501 and the other end is connected to a ground. The oscillation circuit of the control IC 501 oscillates at an oscillation frequency corresponding to the capacitance of the timing capacitor Ct. The control IC 501 controls the detection of the SNS signal and the driving of the FET Q5 (SON signal) in accordance with this oscillation frequency. A drive frequency fs1 of the switching regulator SR1 and a drive frequency fs2 of the switching regulator SR2 according to the present working example are configured to a fixed value according to a circuit constant of an electrical component (example: the capacitance of the timing capacitor Ct). That is, the switching regulators SR1 and SR2 are fixed frequency type switching regulators. It should be noted that a ceramic capacitor can be used for example as the timing capacitor Ct.

Figure 6:
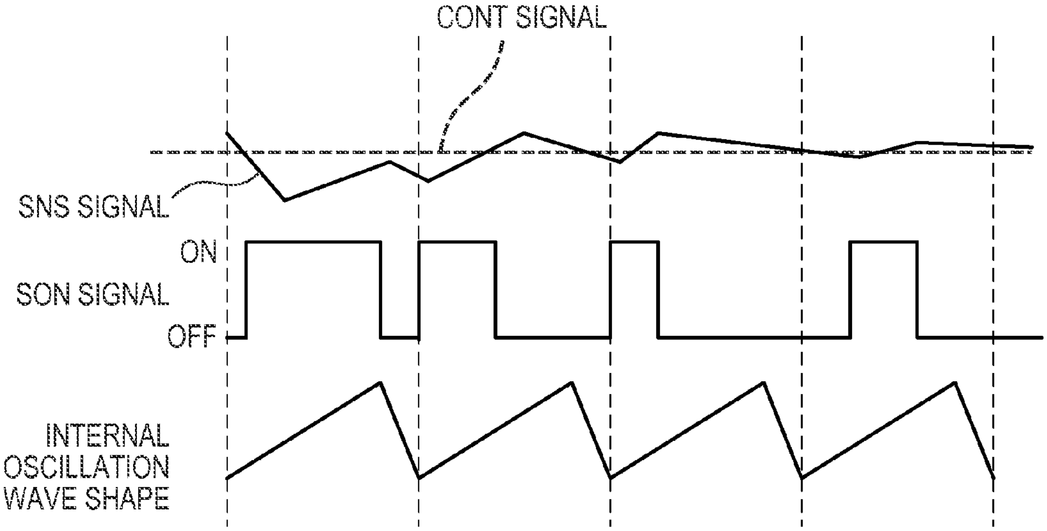
FIG. 6 is a diagram for describing an operation of a control IC.

Description is given using FIG. 6 regarding a relationship between the CONT signal, SNS signal, and SON signal pertaining to the control IC 501 and an output wave shape of an internal oscillation circuit of the control IC 501. When the voltage of the SNS signal falls below the voltage of the CONT signal while the amplitude of the internal oscillation wave shape is rising, the control IC 501 turns the SON signal on (H level) so as to turn on the FET Q5. On the other hand, while the amplitude of the internal oscillation wave shape is dropping, the control IC 501 turns the SON signal off (L level) so as to turn off the FET Q5. In this way, the switching regulators SR1 and SR2 operate based on a drive frequency configured by the timing capacitor Ct, and therefore a ripple of a same frequency as the drive frequency occurs in the output voltages Va and Vb.

Figure 7:
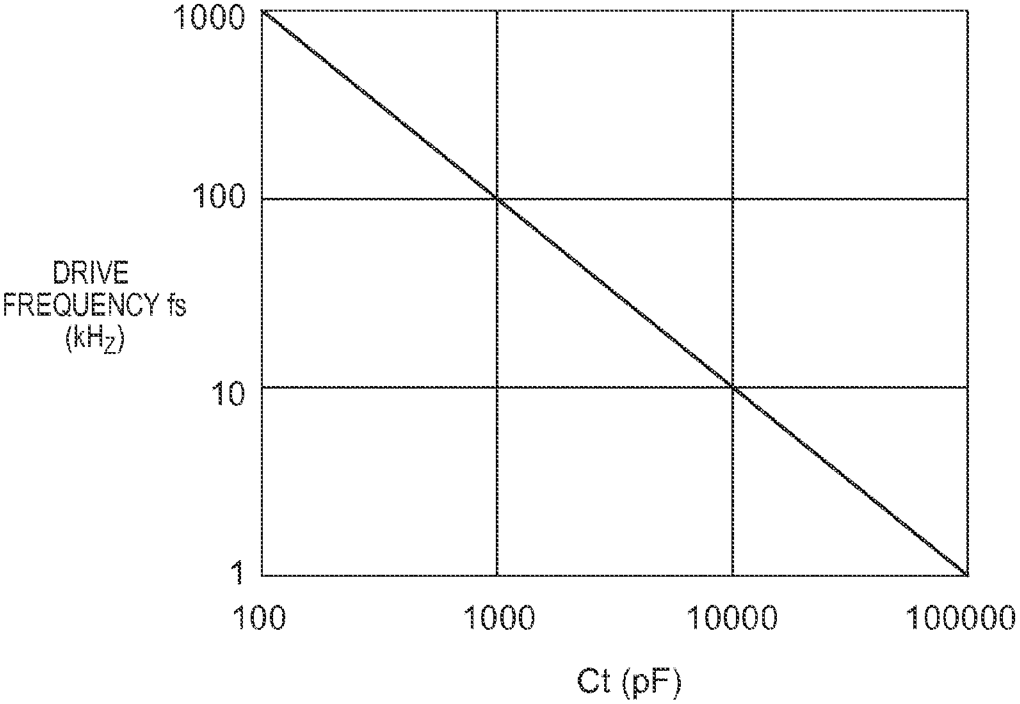
FIG. 7 is a diagram showing a relationship between a timing capacitor and a drive frequency.

Description is given using FIG. 7 regarding a relationship between a capacitance of the timing capacitor Ct and drive frequencies fs of the switching regulators SR1 and SR2. The vertical axis indicates the drive frequency fs and the horizontal axis indicates the capacitance of the timing capacitor Ct. The following relational expression is established between the drive frequency fs and the capacitance of the timing capacitor Ct.

$$fs[\text{kHz}]=100000/Ct(\text{pF})$$

The variation in the capacitance of the ceramic capacitors used as the timing capacitor Ct is ±5%. The variation in the oscillation frequency of the oscillation circuits of the control IC 501 is ±10%. Accordingly, sometimes the drive frequencies will not be in agreement even though two control ICs 501 manufactured using identical manufacturing processes are employed in the switching regulators SR1 and SR2.

Figure 8:
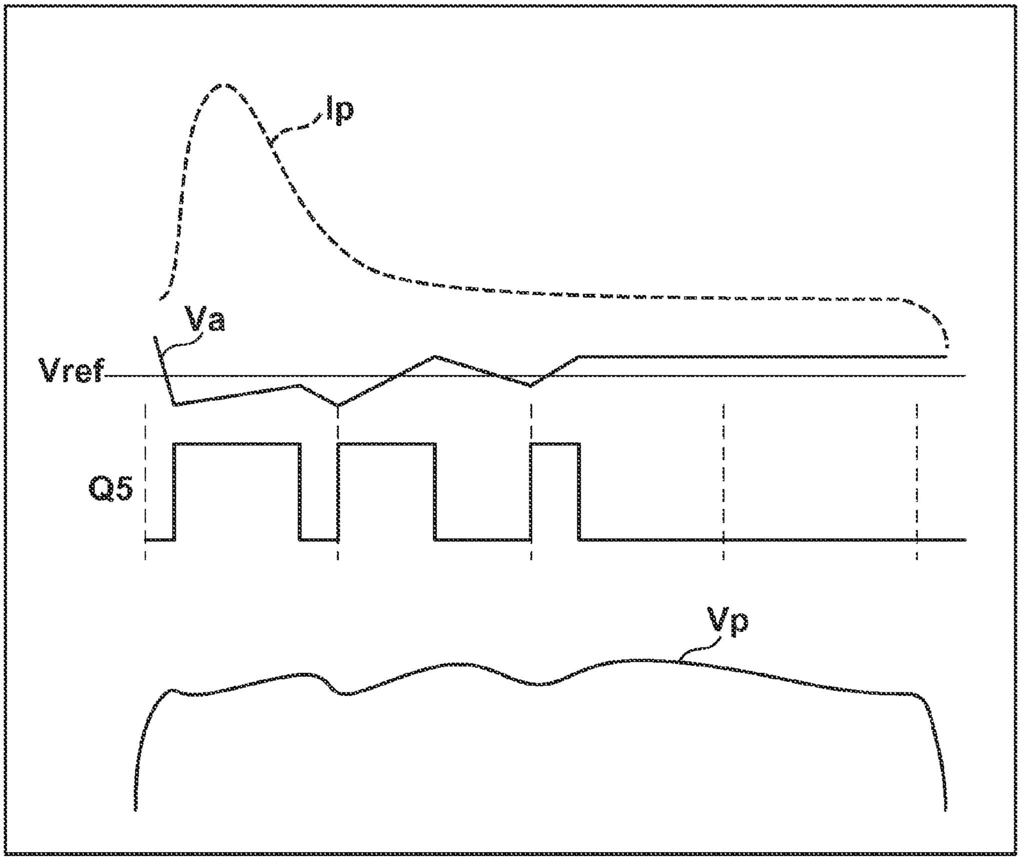
FIG. 8 is a diagram showing a primary side electric current of a transformer, an output voltage of a switching regulator, an operation of a FET, and a developing voltage.

Description is given using FIG. 8 regarding the developing voltage, the primary side electric current Ip, the output voltage Va of the switching regulator SR1, and the wave shape of the on/off of the FET Q5. In regard to the developing voltage in FIG. 8, indication is given regarding the first pulse in the oscillation portion of the biasing duty blank pulse, which is the pulse in which the amplitude is Vp+. Here, description is given mainly in regard to the switching regulator SR1, but this is identical also for the switching regulator SR2.

By flowing the primary side electric current Ip to the primary winding of the transformer T1, the output voltage Va of the switching regulator SR1 drops. When it is detected that the output voltage Va has dropped, the control IC 501 turns on the FET Q5 so as to return the output voltage Va to a reference value Vref. As described above, the output voltage Va has a high frequency ripple component of a period corresponding to the drive frequency fs1. The ripple of the output voltage Va appears also in the developing voltage Vp. The amplitude of the ripple in the developing voltage Vp is approximately 15 Vpp or 20 Vpp for example. Similarly, the output voltage Vb of the switching regulator SR2 also has a ripple originating in the drive frequency of the switching regulator SR2. Here, the drive frequencies of the switching regulators SR1 and SR2 are given as fs1 and fs2 respectively.

Thus, a ripple having an identical frequency to the drive frequencies fs1 and fs2 is present in the output voltages Va and Vb respectively of the two switching regulators SR1 and SR2. Accordingly, a beat of a frequency |fs1-fs2| of the difference between the frequency of the ripple of the output voltage Va and the frequency of the ripple of the output voltage Vb is contained in the developing voltage Vp. This beat causes the banding in the image. Consequently, it is necessary to set the banding in the image formed by the image forming apparatus 100 to an extent that is not visibly recognizable by humans.

According to VTF (visual transfer function) characteristics, striped (dark-light) images having a space frequency of 10 periods/mm or more are recognized as uniform halftones according to human visual characteristics. Accordingly, if the beat frequency |fs1-fs2| is not less than this invisible frequency, the banding caused by the beat tend not to be perceived, which enables reductions in image quality to be suppressed. If the invisible frequency is given as fth, the following expression is established.

$$fth\leq|fs1-fs2|$$

Here, assuming a process speed PS (movement velocity of surface of the photosensitive drum=recording paper transport velocity during transfer of toner image to recording paper) of 100 mm/sec, the following expression can be obtained. It should be noted that the types of numerical values used here are merely illustrative numerical values for the purpose of more easily describing the present invention.

$$\begin{aligned} fth &= 10\ [\text{period/mm}]\times 100\ [\text{mm/sec}] \\ &= 1000/\text{sec} \end{aligned}$$

That is, the beat frequency |fs1-fs2| may be 1000 Hz or more. Accordingly, in a case where the process speed PS is 100 mm/sec, the difference between the lower limit of the drive frequency fs1 of the switching regulator SR1 and the upper limit of the drive frequency fs2 of the switching regulator SR2 is configured at 1 kHz or more. As described above, the drive frequency fs is configured according to the timing capacitor Ct. That is, the following expression is established between the drive frequency fs and the capacitance of the timing capacitor Ct.

$$fs[\text{kHz}]=100000/Ct[\text{pF}]$$

Accordingly, first 1000 pF is selected as the capacitance of the timing capacitor Ct that determines the drive frequency fs1. Next, a lower limit of the drive frequency fs1 is obtained for this case. Suppose that the variation in capacitance of the ceramic capacitor that is the timing capacitor Ct is ±5% and the variation of the oscillation frequency of the control IC 501 is ±10%. The lower limit of the drive frequency fs1 in this case can be calculated from the following expression.

$$fs1\ [\text{kHz}] = \{100000/(1000\ [\text{pF}]\times 1.05)\}\times 0.9$$
$$= 85.7\ \text{kHz}$$

Thus, the upper limit of the drive frequency fs2 can be calculated from the following expression.

$$85.7\ \text{kHz}-1\ \text{kHz}=84.7\ \text{kHz}$$

Thus, by configuring the drive frequency fs2 at 84.7 kHz or lower, the banding in the image is not perceived by humans. It should be noted that the capacitance of the timing capacitor Ct of the switching regulator SR2 at this time can be obtained from the following expression.

$$(100000/0.95)\times(1.1/84.7\ [\text{kHz}])=1370\ \text{pF}$$

Thus, a 1500 pF ceramic capacitor from the E6 series of the capacitor standard may be selected as the timing capacitor Ct of the switching regulator SR2.

By selecting the capacitance of the timing capacitors Ct of the two switching regulators SR1 and SR2 in this manner, the beat frequency, which is the difference between the drive frequencies fs1 and fs2 of the switching regulators SR1 and SR2, is the invisible frequency fth or greater. In this way, the banding in an image is not perceived by humans.

When the drive frequencies fs1 and fs2 of the switching regulators SR1 and SR2 are too high, switching loss of the FET Q5 becomes undesirably large, which is a problem in that the temperature of the FET Q5 rises. On the other hand, when the drive frequencies fs1 and fs2 are too low, a beat occurs undesirably with the frequencies of the pulses of the blank pulse wave shape.

Suppose that in FIG. 2 the drive signals Sig 3 to Sig 6, which carry out on/off control of the FETs Q1 to Q4, are generated by an ASIC or the like in which the oscillation frequency of a liquid crystal oscillator is used as the basic clock. Since the variation in oscillation frequency of a liquid crystal oscillator is 0.1% or less, this is highly precise compared to the variation in the drive frequencies fs1 and fs2 of the switching regulators SR1 and SR2. As described previously, there is variation in the drive frequencies fs1 and fs2 of the switching regulators SR1 and SR2. Consequently, a difference between the drive frequency that is lower of the drive frequencies fs1 and fs2 of the two switching regulators SR1 and SR2 and the pulse frequency may be configured to the invisible frequency fth or higher. The capacitance of the timing capacitor Ct is configured so that the drive frequency that is lower of the drive frequencies fs1 and fs2 becomes 11 kHz or greater.

$$(100000/0.95)\times(1.1/11\ [\text{kHz}])=10530\ [\text{pF}]$$

Thus, the capacitance of the timing capacitor Ct is selected from a capacitance of 10000 pF or lower.

As described above, by devising the drive frequency of the switching regulator that generates the positive side amplitude (Vp+) and the drive frequency of the switching regulator that generates the negative side amplitude (Vp−) of the wave shape of the developing voltage, the banding in the image can be reduced. A cause of the banding is that a beat occurs in the period corresponding to the frequency of the difference between the drive frequencies fs1 and fs2. Thus, the drive frequencies fs1 and fs2 may be configured so that the difference between the drive frequencies fs1 and fs2 is the invisible frequency fth or greater. In the present invention, description was given using one example of fixed frequency type switching regulators whose drive frequencies fs1 and fs2 are fixed at the factory. In the working example, capacitors were used as circuit components for fixing the drive frequencies fs1 and fs2, but other circuit components such as resistors or inductors may be employed.

In the present working example, description was given using one example of a biasing duty blank pulse wave shape constituted by a pulse portion (oscillation portion) and a blank portion (rest portion) as a wave shape of a developing voltage. However, the present invention is also applicable for a continuous pulse wave shape not having a blank portion. Furthermore, in the present working example, description was given using one example of an image forming apparatus 100 that forms a multicolor image using multiple toners of different colors. However, the present invention is also applicable in an image forming apparatus that forms a single color image since the essence of the invention is not dependent on whether there is multiple or single colors. Furthermore, the present invention is applicable as long as the image forming apparatus such as a printer, copier, multifunction device, or fax machine or the like uses an aforementioned power supply apparatus 200.

Furthermore, the bridge circuit in the present working example may be constituted by four switching units. A first switching unit is connected between a first switching regulator and a second end of a primary winding of the transformer and is configured to switch a connection with a first voltage generating unit and a second end of the primary winding of the transformer in a connected state or an unconnected state. A second switching unit is connected between the second end of the primary winding of the transformer and a ground and is configured to switch a connection with the second end of the primary winding of the transformer and a ground in a connected state or an unconnected state. A third switching unit is connected between the second switching regulator unit and a capacitor and is configured to switch a connection with the second voltage generating unit and the capacitor in a connected state or an unconnected state. A fourth switching unit is connected between the capacitor and the ground and is configured to switch a connection with the capacitor and the ground in a connected state or an unconnected state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-103835, filed Apr. 27, 2012, which is hereby incorporated by reference herein in its entirety.

What is claimed is:

1. An image forming apparatus, comprising:

a developing unit configured to carry out developing by causing a developer to adhere to an electrostatic latent image formed on an image carrier; and a voltage generating circuit configured to supply to the developing unit a development bias voltage in which a voltage of a positive pulse is different from a voltage of a negative pulse;

wherein the voltage generating circuit comprises a voltage conversion unit configured to convert a voltage inputted from a primary side to a voltage of a different magnitude and outputs to a secondary side, a bridge circuit connected to the primary side, a first switching regulator configured to generate a first voltage to be applied to the bridge circuit, and a second switching regulator configured to generate a second voltage to be applied to the bridge circuit, and wherein a drive frequency of the first switching regulator and a drive frequency of the second switching regulator are configured so that an absolute value of a difference between the drive frequency of the first switching regulator and the drive frequency of the second switching regulator is not less than a predetermined frequency.

2. The image forming apparatus according to claim 1, wherein the predetermined frequency is an invisible frequency or greater at which change of a banding in an image cannot be recognized by humans.

3. The image forming apparatus according to claim 2, wherein the drive frequency of the first switching regulator and the drive frequency of the second switching regulator are fixed according to a circuit constant of respective electrical components which form the first switching regulator and the second switching regulator.

4. The image forming apparatus according to claim 3, wherein the circuit constant of the respective electrical components is a capacitance of a capacitor.

5. The image forming apparatus according to claim 2, wherein fth, which is the invisible frequency, is determined according to a following expression using a process speed PS (mm/s), which is a movement velocity of a surface of the image carrier:

$$fth=10(\text{period/mm})\times PS(\text{mm/s}).$$

6. The image forming apparatus according to claim 1, wherein the voltage conversion unit comprises a transformer provided with a primary winding and a secondary winding, and a capacitor is connected to a first end of the primary winding, and the bridge circuit comprises:

a first switching unit that is connected between the first switching regulator and a second end of the primary winding of the transformer and is configured to switch a connection with a first voltage generating unit and the second end of the primary winding of the transformer in a connected state or an unconnected state;

a second switching unit that is connected between the second end of the primary winding of the transformer and a ground and is configured to switch a connection with the second end of the primary winding of the transformer and the ground in a connected state or an unconnected state;

a third switching unit that is connected between the second switching regulator and the capacitor and is configured to switch a connection with a second voltage generating unit and the capacitor in a connected state or an unconnected state; and a fourth switching unit that is connected between the capacitor and the ground and is configured to switch a connection with the capacitor and the ground in a connected state or an unconnected state.

7. A voltage generating device used in an image forming apparatus having a developing device configured to carry out developing by causing a developer to adhere to an electrostatic latent image formed on an image carrier, comprising:

a voltage generating circuit configured to supply to the developing device a development bias voltage in which a voltage of a positive pulse is different from a voltage of a negative pulse;

wherein the voltage generating circuit comprises a voltage conversion unit configured to convert a voltage inputted from a primary side to a voltage of a different magnitude and outputs to a secondary side, a bridge circuit connected to the primary side, a first switching regulator configured to generate a first voltage to be applied to the bridge circuit, and a second switching regulator configured to generate a second voltage to be applied to the bridge circuit, and wherein a drive frequency of the first switching regulator and a drive frequency of the second switching regulator are configured so that an absolute value of a difference between the drive frequency of the first switching regulator and the drive frequency of the second switching regulator is not less than a predetermined frequency.

8. The voltage generating device according to claim 7, wherein the predetermined frequency is an invisible frequency or greater at which change of a banding in an image cannot be recognized by humans.

9. The voltage generating device according to claim 8, wherein the drive frequency of the first switching regulator and the drive frequency of the second switching regulator are fixed according to a circuit constant of respective electrical components which form the first switching regulator and the second switching regulator.

10. The voltage generating device according to claim 9, wherein the circuit constant of the respective electrical components is a capacitance of a capacitor

11. The voltage generating device according to claim 8, wherein fth, which is the invisible frequency, is determined according to a following expression using a process speed PS (mm/s), which is a movement velocity of a surface of the image carrier:

$$fth=10(\text{period/mm})\times PS(\text{mm/s}).$$

12. The voltage generating device according to claim 7, wherein the voltage conversion unit comprises a transformer provided with a primary winding and a secondary winding, and a capacitor is connected to a first end of the primary winding, and the bridge circuit comprises:

a first switching unit that is connected between the first switching regulator and a second end of the primary winding of the transformer and is configured to switch a connection with a first voltage generating unit and the second end of the primary winding of the transformer in a connected state or an unconnected state;

a second switching unit that is connected between the second end of the primary winding of the transformer and a ground and is configured to switch a connection with the second end of the primary winding of the transformer and the ground in a connected state or an unconnected state;

a third switching unit that is connected between the second switching regulator and the capacitor and is configured to switch a connection with a second voltage generating unit and the capacitor in a connected state or an unconnected state; and a fourth switching unit that is connected between the capacitor and the ground and is configured to switch a connection with the capacitor and the ground in a connected state or an unconnected state.

* * * * *